United States Patent
Duguay (10) Patent No.: US 9,951,643 B2
(45) Date of Patent: Apr. 24, 2018

(54) RAPID RESPONSE CLEARANCE CONTROL SYSTEM WITH SPRING ASSIST FOR GAS TURBINE ENGINE

(71) Applicant: United Technologies Corporation, Hartford, CT (US)

(72) Inventor: Brian Duguay, Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 240 days.

(21) Appl. No.: 14/781,168

(22) PCT Filed: Feb. 6, 2014

(86) PCT No.: PCT/US2014/015074
§ 371 (c)(1),
(2) Date: Sep. 29, 2015

(87) PCT Pub. No.: WO2014/186002
PCT Pub. Date: Nov. 20, 2014

(65) Prior Publication Data
US 2016/0305268 A1    Oct. 20, 2016

Related U.S. Application Data

(60) Provisional application No. 61/811,539, filed on Apr. 12, 2013.

(51) Int. Cl.
| | | |
|---|---|---|
| *F01D 11/22* | (2006.01) | |
| *F01D 11/14* | (2006.01) | |
| *F01D 11/16* | (2006.01) | |
| *F01D 11/20* | (2006.01) | |
| *F01D 25/24* | (2006.01) | |
| *F02C 7/28* | (2006.01) | |

(52) U.S. Cl.
CPC .............. *F01D 11/22* (2013.01); *F01D 11/14* (2013.01); *F01D 11/16* (2013.01); *F01D 11/20* (2013.01); *F01D 25/24* (2013.01); *F02C 7/28* (2013.01); *F05D 2220/32* (2013.01); *F05D 2240/55* (2013.01); *F05D 2270/01* (2013.01)

(58) Field of Classification Search
CPC .......... F01D 11/22; F01D 11/14; F01D 11/16; F01D 11/20; F01D 25/24; F05D 2270/01
See application file for complete search history.

(56) References Cited

U.S. PATENT DOCUMENTS

| | | |
|---|---|---|
| 4,565,492 A | 1/1986 | Bart et al. |
| 5,056,988 A | 10/1991 | Corsmeier et al. |
| 9,068,471 B2 * | 6/2015 | Klingels ................. F01D 11/22 |
| 2004/0071548 A1 | 4/2004 | Wilson, Jr. |
| 2010/0209231 A1 | 8/2010 | Lewis |
| 2010/0303612 A1 | 12/2010 | Bhatnagar et al. |

* cited by examiner

*Primary Examiner* — Logan Kraft
*Assistant Examiner* — Peter T Hrubiec
(74) *Attorney, Agent, or Firm* — O'Shea Getz P.C.

(57) ABSTRACT

An active clearance control system of a gas turbine engine includes an actuation cylinder, a puller engaged with an air seal segment and damped with respect to the actuation cylinder, and a full-hoop thermal control ring that at least partially supports the air seal segment. The puller may move the air seal segment between an extended radially contracted BOAS position and a retracted radially expanded BOAS position.

15 Claims, 8 Drawing Sheets

RAPID RESPONSE CLEARANCE CONTROL SYSTEM WITH SPRING ASSIST FOR GAS TURBINE ENGINE

This application claims priority to PCT Patent Application No. PCT/US14/15074 filed Feb. 6, 2014, which claims priority to U.S. Patent Appln. No. 61/811,539 filed Apr. 12, 2013.

STATEMENT REGARDING FEDERALLY SPONSORED RESEARCH OR DEVELOPMENT

This disclosure was made with Government support under FA-8650-09-D-2923 0021 awarded by The United States Air Force. The Government has certain rights in this disclosure.

BACKGROUND

The present disclosure relates to a gas turbine engine and, more particularly, to a blade tip rapid response active clearance control (RRACC) system therefor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. The compressor and turbine sections include rotatable blade and stationary vane arrays. Within an engine case structure, the radial outermost tips of each blade array are positioned in close proximity to a shroud assembly. Blade Outer Air Seals (BOAS) supported by the shroud assembly are located adjacent to the blade tips such that a radial tip clearance is defined therebetween.

When in operation, the thermal environment in the engine varies and may cause thermal expansion and contraction such that the radial tip clearance varies. The radial tip clearance is typically designed so that the blade tips do not rub against the BOAS under high power operations when the blade disk and blades expand as a result of thermal expansion and centrifugal loads. When engine power is reduced, the radial tip clearance increases. To facilitate engine performance, it is operationally advantageous to maintain a close radial tip clearance through the various engine operational conditions.

SUMMARY

A drive link for an active clearance control system of a gas turbine engine according to one disclosed non-limiting embodiment of the present disclosure includes a puller damped with respect to an actuation cylinder.

A further embodiment of the present disclosure includes, wherein the puller is damped with respect to the actuation cylinder by a spring.

A further embodiment of any of the foregoing embodiments of the present disclosure includes a stop within the actuation cylinder to limit relative movement of the puller.

A further embodiment of any of the foregoing embodiments of the present disclosure includes, wherein the puller includes a plate configured to engage a forward hook and an aft hook of an air seal segment.

A further embodiment of any of the foregoing embodiments of the present disclosure includes a rod affixed to the plate.

A further embodiment of any of the foregoing embodiments of the present disclosure includes a rod affixed to the plate, the rod extends into the actuation cylinder.

A further embodiment of any of the foregoing embodiments of the present disclosure includes a radial flange that extends from the rod, the radial flange engaged with the spring.

A further embodiment of any of the foregoing embodiments of the present disclosure includes, wherein the radial flange is engageable with the stop.

An active clearance control system of a gas turbine engine according to one disclosed non-limiting embodiment of the present disclosure includes a puller mounted to the actuation cylinder to move an air seal segment between an extended radially contracted BOAS position and a retracted radially expanded BOAS position, said puller damped with respect to an actuation cylinder.

A further embodiment of any of the foregoing embodiments of the present disclosure includes an actuator mounted to the actuation to move the puller in response to a control.

A further embodiment of any of the foregoing embodiments of the present disclosure includes, wherein the puller is damped with respect to the actuation cylinder.

A further embodiment of any of the foregoing embodiments of the present disclosure includes, wherein the puller is damped with a spring with respect to said actuation cylinder.

A further embodiment of any of the foregoing embodiments of the present disclosure includes a stop to limit compression of the spring.

A method of active blade tip clearance control for a gas turbine engine, according to one disclosed non-limiting embodiment of the present disclosure includes engaging a puller with an air seal segment; and damping the puller with respect to an actuation cylinder.

A further embodiment of any of the foregoing embodiments of the present disclosure includes at least partially supporting the air seal segment with a full-hoop thermal control ring.

A further embodiment of any of the foregoing embodiments of the present disclosure includes engaging a plate of the puller with the forward hook and the aft hook of each of the multiple of air seal segments.

A further embodiment of any of the foregoing embodiments of the present disclosure includes damping the puller with respect to the actuation cylinder with a spring.

A further embodiment of any of the foregoing embodiments of the present disclosure includes limiting compression of the spring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
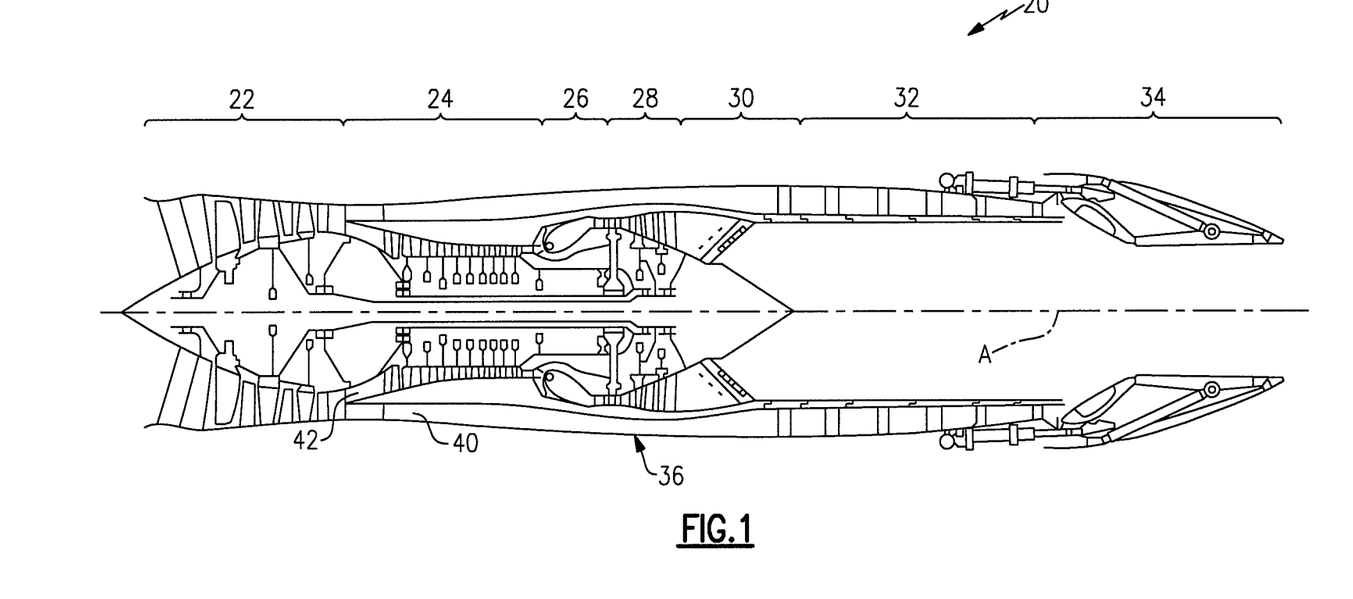
FIG. 1 is a schematic cross-section of one example aero gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case static structure 36 defines a generally annular secondary airflow path 40 around a core airflow path 42. Various case static structures and modules may define the engine case static structure 36 which essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
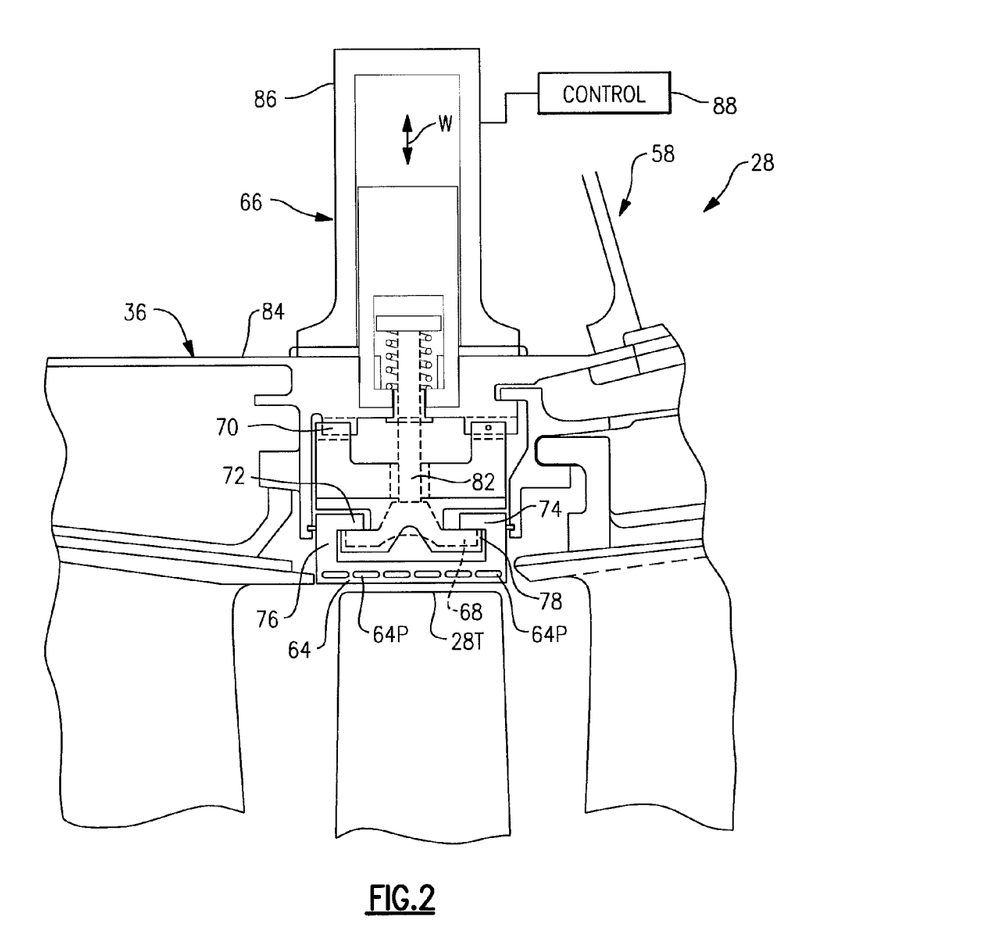
FIG. 2 is an is an enlarged partial sectional schematic view of a portion of a rapid response active clearance control system according to one disclosed non-limiting embodiment.

With reference to FIG. 2, a blade tip rapid response active clearance control (RRACC) system 58 includes a radially adjustable blade outer air seal system 60 that operates to control blade tip clearances inside for example, the turbine section 28, however, other sections such as the compressor section 24 may also benefit herefrom. The radially adjustable blade outer air seal system 60 may be arranged around each or particular stages within the gas turbine engine 20. That is, each rotor stage may have an associated radially adjustable blade outer air seal system 60 of the blade tip rapid response active clearance control system 58.

Figure 3:
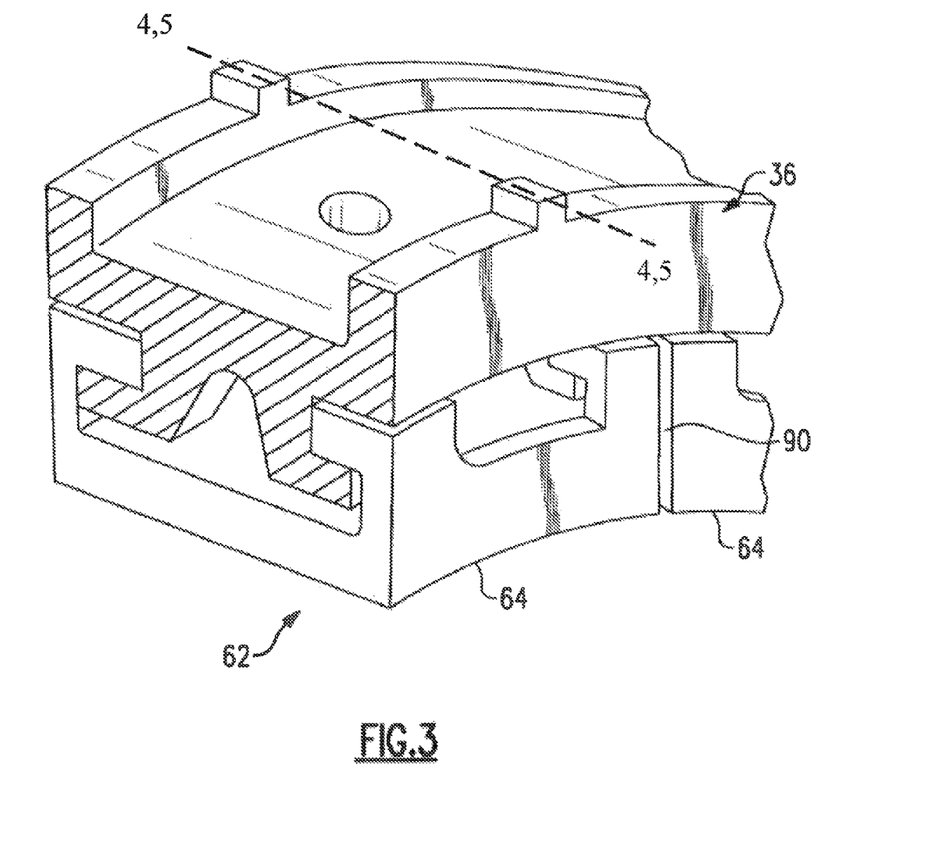
FIG. 3 is an enlarged top view of one of a multiple of air seal segments of the rapid response active clearance control system.

Each radially adjustable blade outer air seal system 60 is subdivided into a multiple of circumferential segments 62, each with a respective air seal segment 64 and a drive link 66 with a puller 68 (also shown in FIG. 3). In one disclosed non-limiting embodiment, each circumferential segment 62 may extend circumferentially for about nine (9) degrees. It should be appreciated that any number of circumferential segments 62 may be and various other components may alternatively or additionally be provided.

Each of the multiple of air seal segments 64 is at least partially supported by a generally fixed full-hoop thermal control ring 70. That is, the full-hoop thermal control ring 70 is mounted to, or forms a portion of, the engine case static structure 36 to thermally expand and contract and at least partially control blade tip clearances in a passive manner. It should be appreciated that various static structures may additionally or alternatively be provided to at least partially support the multiple of air seal segments 64 yet permit relative radial movement therebetween.

Each air seal segment 64 may be manufactured of an abradable material to accommodate potential interaction with the rotating blade tips 28T within the turbine section 28. Each air seal segment 64 also includes numerous cooling air passages 64P to permit secondary airflow therethrough.

A radially extending forward hook 72 and an aft hook 74 of each air seal segment 64 respectively cooperates with a forward hook 76 and an aft hook 78 of the full-hoop thermal control ring 70. The forward hook 76 and the aft hook 78 of the full-hoop thermal control ring 70 may be segmented (FIG. 3) or otherwise configured for assembly of the corresponding respective air seal segment 64 thereto. The forward hook 72 may extend axially aft and the aft hook 74 may extend axially forward (shown); vice-versa or both may extend axially forward or aft within the engine to engage the reciprocally directed forward hook 76 and aft hook 78 of the full-hoop thermal control ring 70.

Figure 4:
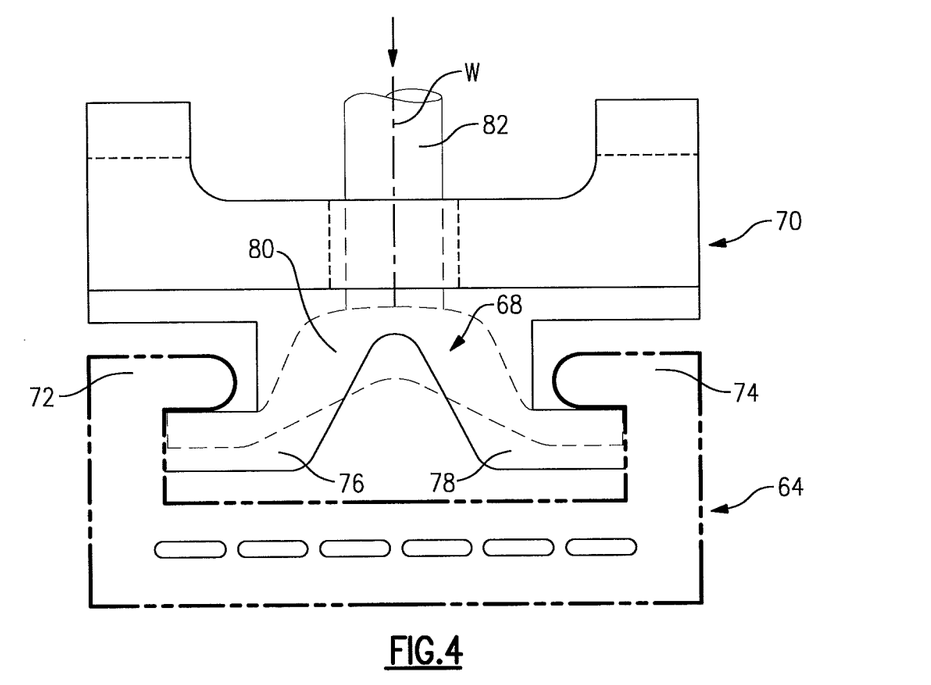
FIG. 4 is an enlarged partial sectional schematic view of one of a multiple of air seal segments taken along line 4,5-4,5 in FIG. 3 with the rapid response active clearance control system in an extended radially contracted BOAS position.
Figure 5:
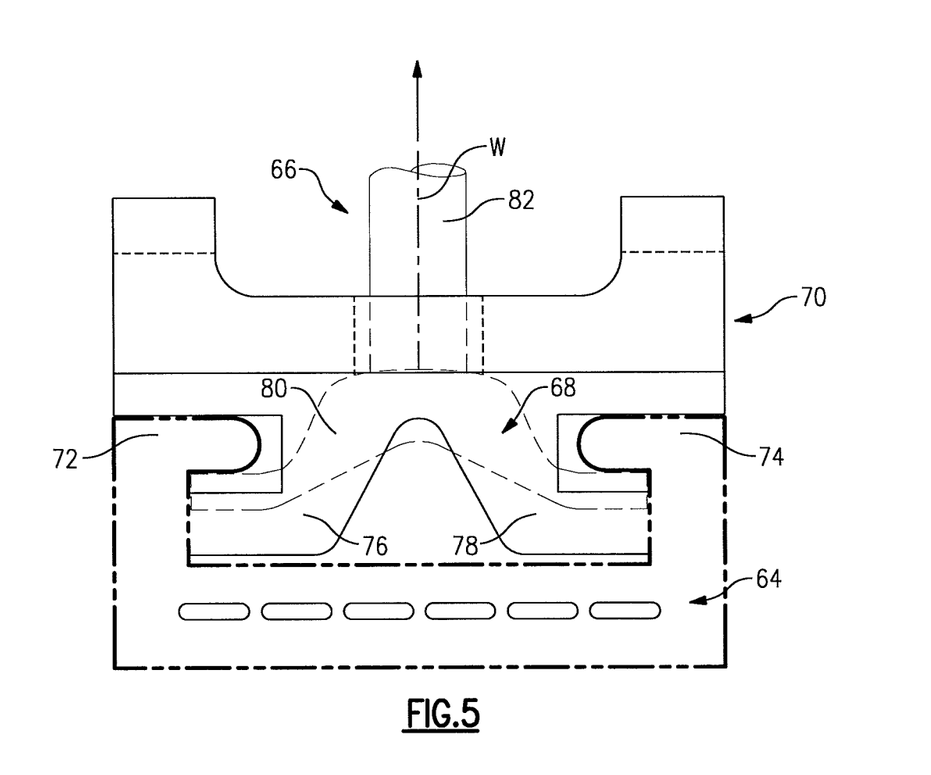
FIG. 5 is an enlarged partial sectional schematic view of one of a multiple of air seal segments taken along line 4,5-4,5 in FIG. 3 with the rapid response active clearance control system in a retracted radially expanded BOAS position.

With continued reference to FIG. 2, the forward hook 76 and the aft hook 78 also interact with the puller 68 which permits the respective air seal segment 64 to be radially positioned between an extended radially contracted BOAS position (FIG. 4) and a retracted radially expanded BOAS position (FIG. 5) with respect to the full-hoop thermal control ring 70 by the puller 68. The puller 68 need only "pull" each associated air seal segment 64 as a differential pressure from the core airflow biases the air seal segment 64 toward the extended radially contracted BOAS position (FIG. 4). For example, the differential pressure may exert an about 1000 pounds (454 Kilograms) inward force on each air seal segment 64.

The puller 68 generally includes a plate 80 and a rod 82. The plate 80 may be X-shaped or otherwise configured to engage the forward hook 72 and the aft hook 74 of the respective air seal segment 64 (FIG. 3). It should be appreciated that other configurations may alternatively be provided. The rod 82 is rigidly mounted to the plate 80, e.g., fastened, bolted, welded, brazed, etc. such that movement of the rod 82 moves the plate 80 which then radially positions the respective air seal segment 64.

The puller 68 provides actuation of the respective air seal segment 64 yet permits the effective use of legacy cooling schemes. That is, the plate 80 is engageable with the respective air seal segment 64 but because the plate 80 is not rigidly mounted directly to the retractable air seal segment 64, the puller 80 has minimal—if any—effect upon the numerous cooling air passages 64P. The plate 80 interfaces with the respective air seal segment 64 and also reduces the radial tolerance stack to permits the puller 68 to support at least a portion of a radial load when the respective air seal segment 64 are in the circumferentially contracted position (FIG. 4).

Each drive link 66 may extend through an engine case 84 to an actuator 86 (illustrated schematically) that operates in response to a control 88 (illustrated schematically). The actuator 86 may include a mechanical, electrical and/or pneumatic drive that operates to move the drive link 66 along a drive link axis W so as to contract and expand the radially adjustable blade outer air seal system 60. It should be appreciated that various other control components such as sensors, actuators and other subsystems may be utilized herewith.

The control 88 generally includes a control module that executes radial tip clearance control logic to thereby control the radial tip clearance relative the rotating blade tips. The control module typically includes a processor, a memory, and an interface. The processor may be any type of known microprocessor having desired performance characteristics. The memory may be any computer readable medium which stores data and control algorithms such as logic as described herein. The interface facilitates communication with other components such as a thermocouple, and the actuator 86. In one non-limiting embodiment, the control module may be a portion of a flight control computer, a portion of a Full Authority Digital Engine Control (FADEC), a stand-alone unit or other system.

In operation, the blade tip rapid response active clearance control system 58 may utilize, for example, an actuator 86 that provides about 1200-1400 pounds (544-635 kilograms) of force to provide a radial displacement capability for the array of air seal segments 64 of about 0.040" (40 thousandths; 1 mm) in one disclosed non-limiting embodiment. The radial displacement may, at least partially, be a function of the engine core size and the dynamic conditions of the particular engine architecture.

Figure 6:
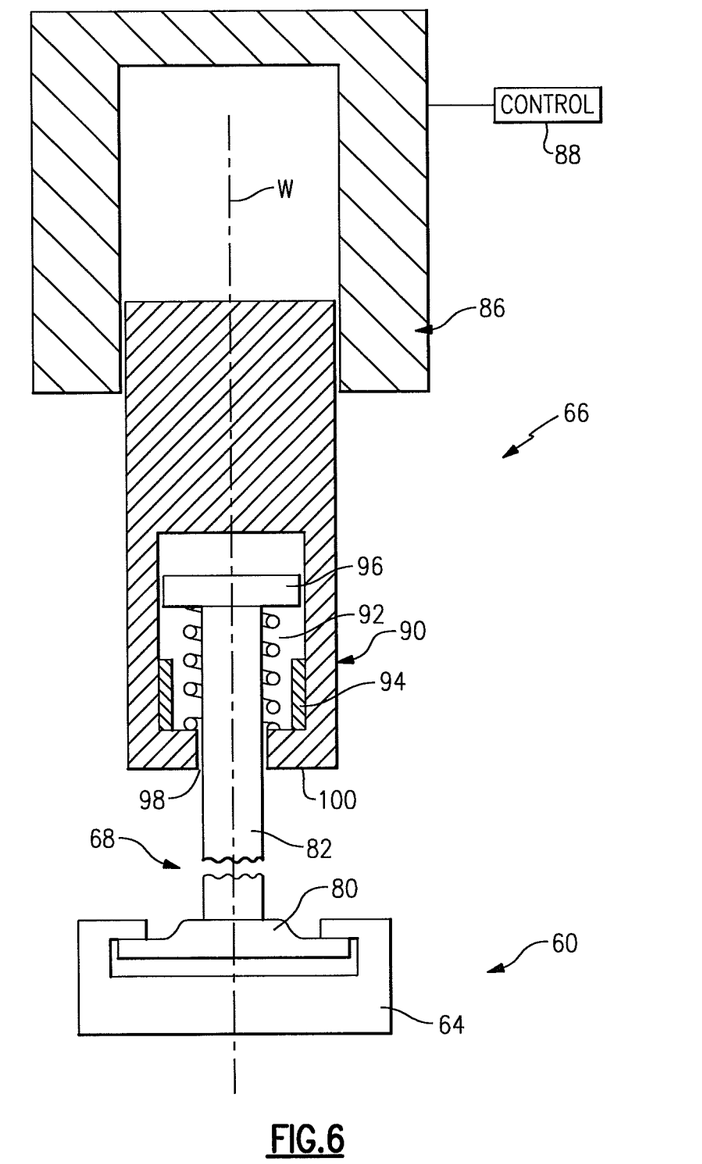
FIG. 6 is a partial sectional schematic view of a drive link for the rapid response active clearance control system in the extended radially contracted BOAS position.

With reference to FIG. 6, the drive link 66 generally includes the puller 68 an actuation cylinder 90, a spring 92 and a stop 94. The rod 82 of the puller 68 includes a flanged end 96 within the actuation cylinder 90 that is biased by the spring 92 with respect to the stop 94.

The actuation cylinder 90 may be a portion of, or extend from the actuator 86 (illustrated schematically). The actuation cylinder 90 is thereby movable along the drive link axis W so as to contract and expand the radially adjustable blade outer air seal system 60 between the extended radially contracted BOAS position (FIG. 6) and a retracted radially expanded BOAS position (FIG. 7) to contract and expand the radially adjustable blade outer air seal system 60. That is, the actuation cylinder 90 of the drive link 66 is actively actuated and the puller 68 is partially isolated therefrom to provide a predefined damped movement thereto at the extended radially contracted BOAS position (FIG. 6) and the retracted radially expanded BOAS position (FIG. 7).

The rod 82 extends through an aperture 98 in an end section 100 of the actuation cylinder 90 along axis W. The spring 92 interacts with the flanged end 96 to bias the puller 68 outward with respect to the engine case 84 toward the retracted radially expanded BOAS position (FIG. 6). That is, the spring 92 provides a bias force towards the retracted radially expanded BOAS position (FIG. 7).

Figure 7:
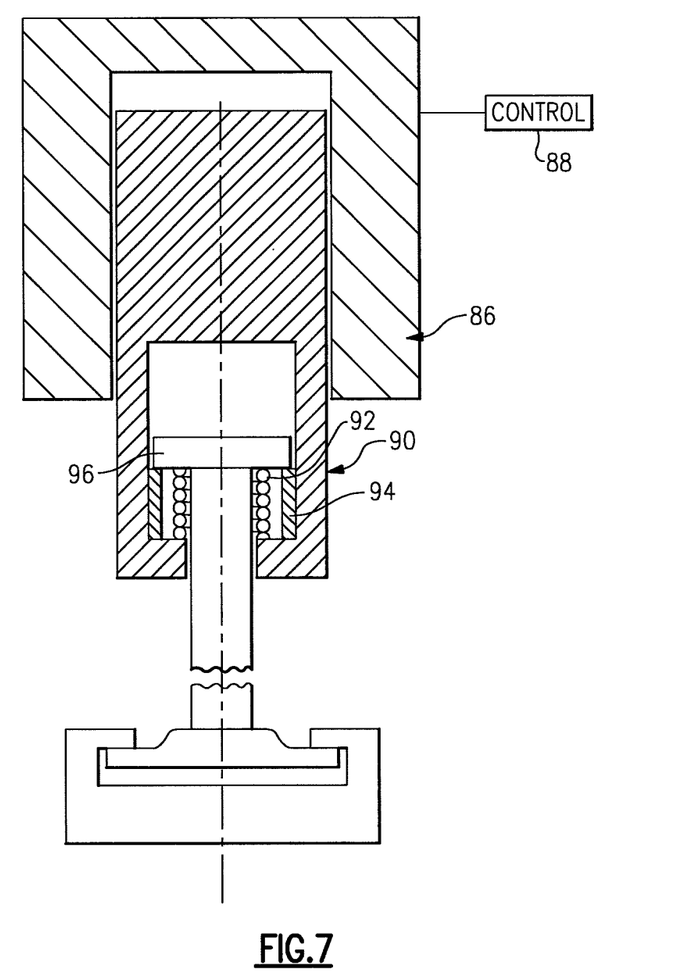
FIG. 7 is a partial sectional schematic view of the drive link for the rapid response active clearance control system in the retracted radially expanded BOAS position.
Figure 8:
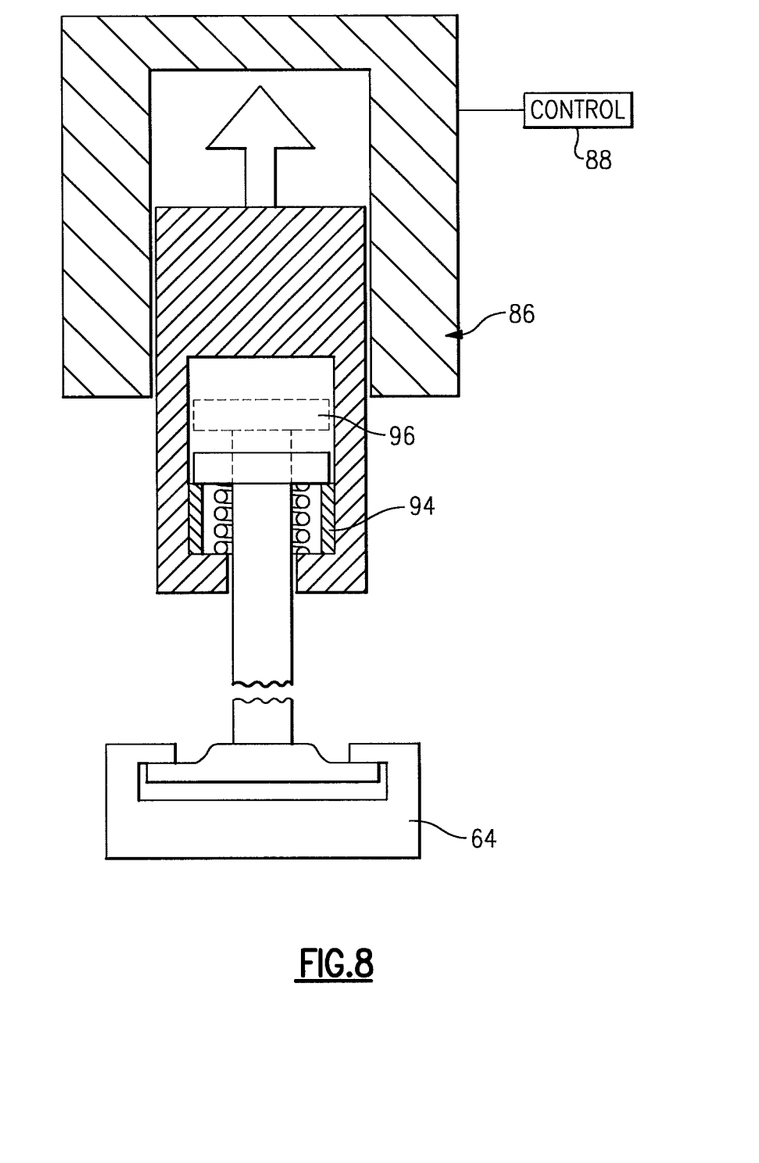
FIG. 8 is a partial sectional schematic view of the drive link for the rapid response active clearance control system during actuation from the extended radially contracted BOAS position to the retracted radially expanded BOAS position.

The stop 94 prevents the spring 92 from being crushed during retraction of the actuation cylinder 90 (FIG. 8) toward the retracted radially expanded BOAS position (FIG. 7). That is, a "hard stop" is provided when the full force of the BOAS load is being applied by the actuator 86 (FIG. 8) that may be on the order of about 1200-1400 pounds (544-635 kilograms) of force. This is particularly beneficial when an on-off type blade tip rapid response active clearance control (RRACC) system 58 is utilized.

The drive link 66 of the rapid response active clearance control system 58 provides thermal and aerodynamic isolation from the respective air seal segment 64; and allows radial growth due to thermal expansion, yet maintains tension when de-activated that reduces an impact load when retracting. The drive link 66 provides mechanical attachment that accommodates radial grown due to thermal expansion yet, when de-activated, minimizes rattle and vibration.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An active clearance control system of a gas turbine engine comprising:
    an actuation cylinder;
    a puller engaged with an air seal segment and damped with respect to said actuation cylinder; and
    a full-hoop thermal control ring that at least partially supports said air seal segment.

2. The system as recited in claim 1, wherein said puller is damped with respect to said actuation cylinder by a spring.

3. The system as recited in claim 2, further comprising a stop within said actuation cylinder to limit relative movement of said puller.

4. The system as recited in claim 3, wherein said puller includes a plate configured to engage a forward hook and an aft hook of said air seal segment.

5. The system as recited in claim 4, further comprising a rod affixed to said plate.

6. The system as recited in claim 4, further comprising a rod affixed to said plate, said rod extends into said actuation cylinder.

7. The system as recited in claim 6, further comprising a radial flange that extends from said rod, said radial flange engaged with said spring.

8. The system as recited in claim 7, wherein said radial flange is engageable with said stop.

9. An active clearance control system of a gas turbine engine comprising:
    an actuation cylinder;
    a puller mounted to said actuation cylinder to move an air seal segment between an extended radially contracted BOAS position and a retracted radially expanded BOAS position, said puller damped with respect to said actuation cylinder; and
    a full-hoop thermal control ring that at least partially supports said air seal segment.

10. The system as recited in claim 9, further comprising an actuator mounted to said actuation cylinder to move said puller in response to a control.

11. The system as recited in claim 9, further comprising:
    spring; and
    a stop,
    wherein said puller is damped with respect to said actuation cylinder by said spring and said stop limits compression of said spring.

12. A method of active blade tip clearance control for a gas turbine engine, comprising:
    engaging a puller with an air seal segment;
    damping said puller with respect to an actuation cylinder; and
    at least partially supporting said air seal segment with a full hoop thermal control ring.

13. The method as recited in claim 12, further comprising:
    engaging a plate of the puller with a forward hook and an aft hook of said air seal segment.

14. The method as recited in claim 12, further comprising:
    damping said puller with respect to said actuation cylinder with a spring.

15. The method as recited in claim 14, further comprising:
    limiting compression of the spring.

* * * * *

UNITED STATES PATENT AND TRADEMARK OFFICE
CERTIFICATE OF CORRECTION

PATENT NO. : 9,951,643 B2
APPLICATION NO. : 14/781168
DATED : April 24, 2018
INVENTOR(S) : Brian Duguay

Page 1 of 1

It is certified that error appears in the above-identified patent and that said Letters Patent is hereby corrected as shown below:

In the Claims

Column 8, Line 28, Claim 13 delete "the" and insert --said--.
Column 8, Line 34, Claim 15 delete "the" and insert --said--.

Signed and Sealed this
Fifth Day of June, 2018

Andrei Iancu
*Director of the United States Patent and Trademark Office*